US00RE34458E

United States Patent [19]

Fahrenholz

[11] E Patent Number: Re. 34,458

[45] Reissued Date of Patent: Nov. 30, 1993

[54] SCREENING MACHINE

[76] Inventor: Harley D. Fahrenholz, P.O. Box 343, Alexandria, Minn. 56308

[21] Appl. No.: 826,985

[22] Filed: Jan. 28, 1992

Related U.S. Patent Documents

Reissue of:

[64] Patent No.: 4,896,835
Issued: Jan. 30, 1990
Appl. No.: 374,603
Filed: Jun. 30, 1989

U.S. Applications:

[63] Continuation of Ser. No. 217,060, Jul. 11, 1988, abandoned, which is a continuation of Ser. No. 859,612, May 5, 1986, abandoned.

[51] Int. Cl.[5] ..... B02C 13/00; B07B 9/00

[52] U.S. Cl. ..... 241/74; 209/234; 209/241; 209/288; 209/296; 209/390; 209/393; 209/420; 241/77; 241/81; 241/290

[58] Field of Search ..... 209/288, 296, 299, 390, 209/234, 243, 244, 246, 247, 248, 259, 260, 294, 298, 352, 381–385, 393, 394, 420, 421; 241/193, 74, 102, 77, 81, 290

[56] References Cited

U.S. PATENT DOCUMENTS

| | | | |
|---|---|---|---|
| 16,495 | 1/1857 | Pollock | 209/298 X |
| 958,343 | 5/1910 | Whitman | 209/394 |
| 1,034,552 | 8/1912 | Williams | 241/193 X |
| 1,076,062 | 10/1913 | Quenner | 241/193 X |
| 1,118,673 | 11/1914 | Northrup | 209/293 |
| 1,617,919 | 2/1927 | Madsen | 209/394 |
| 1,703,956 | 3/1929 | Royer | 241/193 X |
| 2,164,796 | 7/1939 | Bird | 209/242 |
| 2,261,771 | 11/1941 | Laubenstein | 209/393 |
| 3,025,067 | 3/1962 | Raney et al. | 241/193 X |
| 3,233,836 | 2/1966 | Merges | 209/299 |
| 3,393,876 | 7/1968 | Elmore | 209/3 |
| 3,402,816 | 9/1968 | Taylor | 209/421 |
| 3,825,018 | 7/1974 | Ferraro | 130/304 |
| 3,941,689 | 3/1976 | Hirayama et al. | 209/296 |
| 4,017,035 | 4/1977 | Stuttmann | 241/289 |
| 4,020,993 | 5/1977 | Frazerhurst et al. | 241/79.3 |
| 4,167,975 | 9/1979 | Fahrenholz | 171/12 |
| 4,303,506 | 12/1981 | Finlay | 209/247 |
| 4,469,230 | 9/1984 | Gorlitz et al. | 209/930 |
| 4,592,516 | 6/1986 | Tschantz | 241/77 |
| 4,648,560 | 3/1987 | Rolle et al. | 241/77 |

FOREIGN PATENT DOCUMENTS

| | | | |
|---|---|---|---|
| 0104323 | 4/1984 | European Pat. Off. | 241/79.3 |
| 42840 | 3/1908 | Fed. Rep. of Germany | 209/234 |
| 696751 | 8/1940 | Fed. Rep. of Germany | 241/193 |
| 619396 | 3/1927 | France | 209/296 |
| 48529 | 3/1938 | France | 209/293 |
| 0046572 | 4/1977 | Japan | 209/390 |
| 0611691 | 6/1978 | U.S.S.R. | 209/296 |
| 0904806 | 2/1982 | U.S.S.R. | 209/393 |
| 5799 | of 1829 | United Kingdom | 204/386 |

*Primary Examiner*—Joseph E. Valenza
*Attorney, Agent, or Firm*—Kinney & Lange

[57] ABSTRACT

A screening machine has a rotating screening drum for screening dirt or other material to a desired size through the screen openings, and is made so that it reduces clogging of the screen, even when rocks, dirt clods, and moist dirt is being screened. The rotating drum has interior brushes and a beater bar for keeping the material moving on the interior of the drum. A holding bin and feeding conveyor is used at the input end of the machine and is positioned to empty into an input pulverizer or shredder, that has a powered drum that will break the dirt clods up. The holding bin has a cover grate to remove excessively large rocks and the like. The output from the pulverizing roller also drops material onto a grate through which the material passes before reaching the screening drum. These grates are called "grizzly bars" and help in the classification process. The screening drum can be converted to a mixer drum by lining the screen wall with sheet metal and removing the normally used interior brushes.

15 Claims, 5 Drawing Sheets

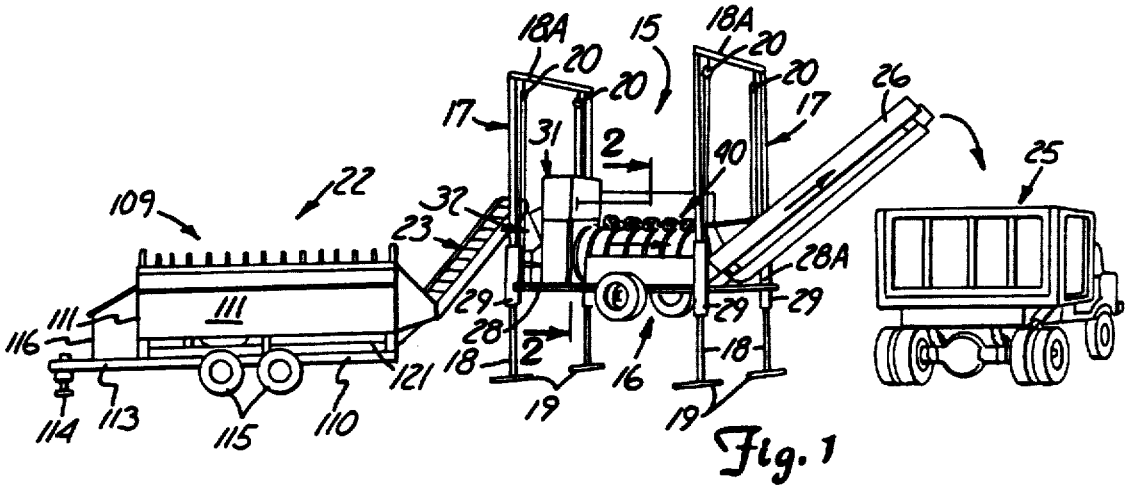
Fig. 1
Fig. 2
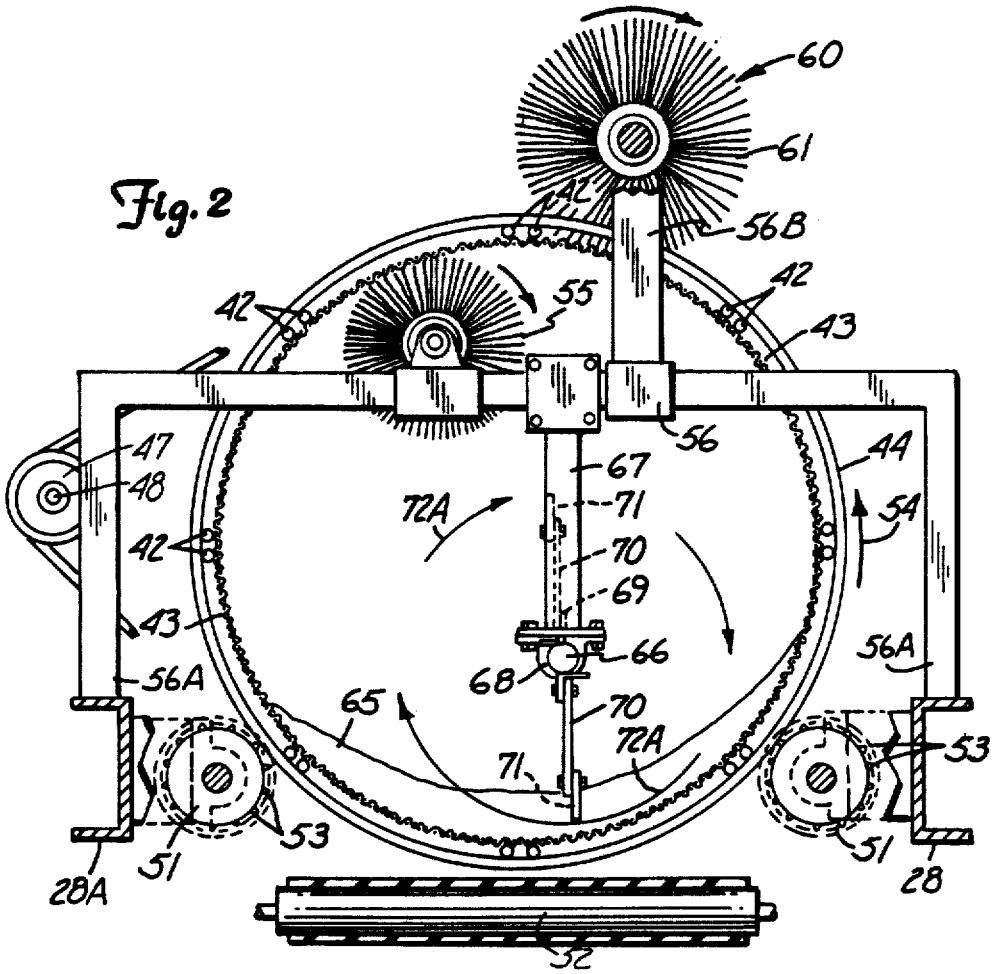

80
81
81A
82
83
84
85
88
89
90
92
93
95
95B
96
96A
97
97A
98
99
109
120
120A
121
121A
122
129
130
132
133
133A
133B
140
141
142
36
37
40
45
46
49
50A
50B
50C
50D
28A

SCREENING MACHINE

Matter enclosed in heavy brackets [ ] appears in the original patent but forms no part of this reissue specification; matter printed in italics indicates the additions made by reissue.

This is a continuation of U.S. Patent Application Ser. No. 07/217,060, filed Jul. 11, 1988, which in turn was a continuation of application Ser. No. 06/859,612, filed May 5, 1986, both now abandoned.

BACKGROUND OF THE INVENTION

1. Field of the Invention

The present invention relates to screening machines utilizing rotating tumblers.

2. Description of the Prior Art

Machines that have tumblers are known in the art, for example, the present applicant's U.S. Pat. No. 4,167,975 shows a basic machine substantially similar in framework and rotating tumbler to that disclosed herein, but which does not include the refinements necessary for making it work for a dirt screening machine. U.S. Pat. No. 4,167,975 is a beach cleaning apparatus having a rotating drum for screening with a single brush in the interior of the drum for keeping the screen openings clean. Because sand is a free flowing material, the problems associated with screening are less than with dirt.

U.S. Pat. No. 3,825,018 also shows a machine using a rotating drum having a screen with a brush on the outside.

SUMMARY OF THE INVENTION

The present invention relates to screening machines that can be used for screening black dirt efficiently and rapidly. The machine utilizes a rotating tumbler that has cleaning and mixing mechanisms. Additionally, the input to the screening machine preferably has a holding bin and conveyor that is constructed in a unique manner so that loads of dirt to be screened can be dumped into the holding bin through a large grate (grizzly bars) that will provide removal of large rocks and the like. The grate can be inclined and/or swung out of the way when desired. The dirt that is placed in the holding bin can be stored and then conveyed to a dirt pulverizer, and then conveyed to the screening tumbler. The pulverizer and the holding bin both have grates or grizzly bars associated therewith for separating out rocks of substantial size to provide classification of materials that are to be passed through the screening machine.

Additionally, the holding bin bottom conveyor belt has cleaners on the interior surface which contact the belt drive rollers. The conveyors for the holding bin are individually driven from one or more separate motors, and the components for the screening machine can be driven from a gasoline engine mounted directly on the screening machine assembly. The screening machine assembly is supported above the ground a desired distance, and the material can fall down into a pile or be carried away with a conveyor belt underneath the screening machine.

BRIEF DESCRIPTION OF THE DRAWINGS

FIG. 1 is a fragmentary schematic perspective view of a screening plant made according to the present invention;

FIG. 2 is a sectional view taken generally along line 2—2 in FIG. 1 illustrating schematically the mounting of a screening drum and its construction;

DETAILED DESCRIPTION OF THE PREFERRED EMBODIMENT

Figures 3, 10:
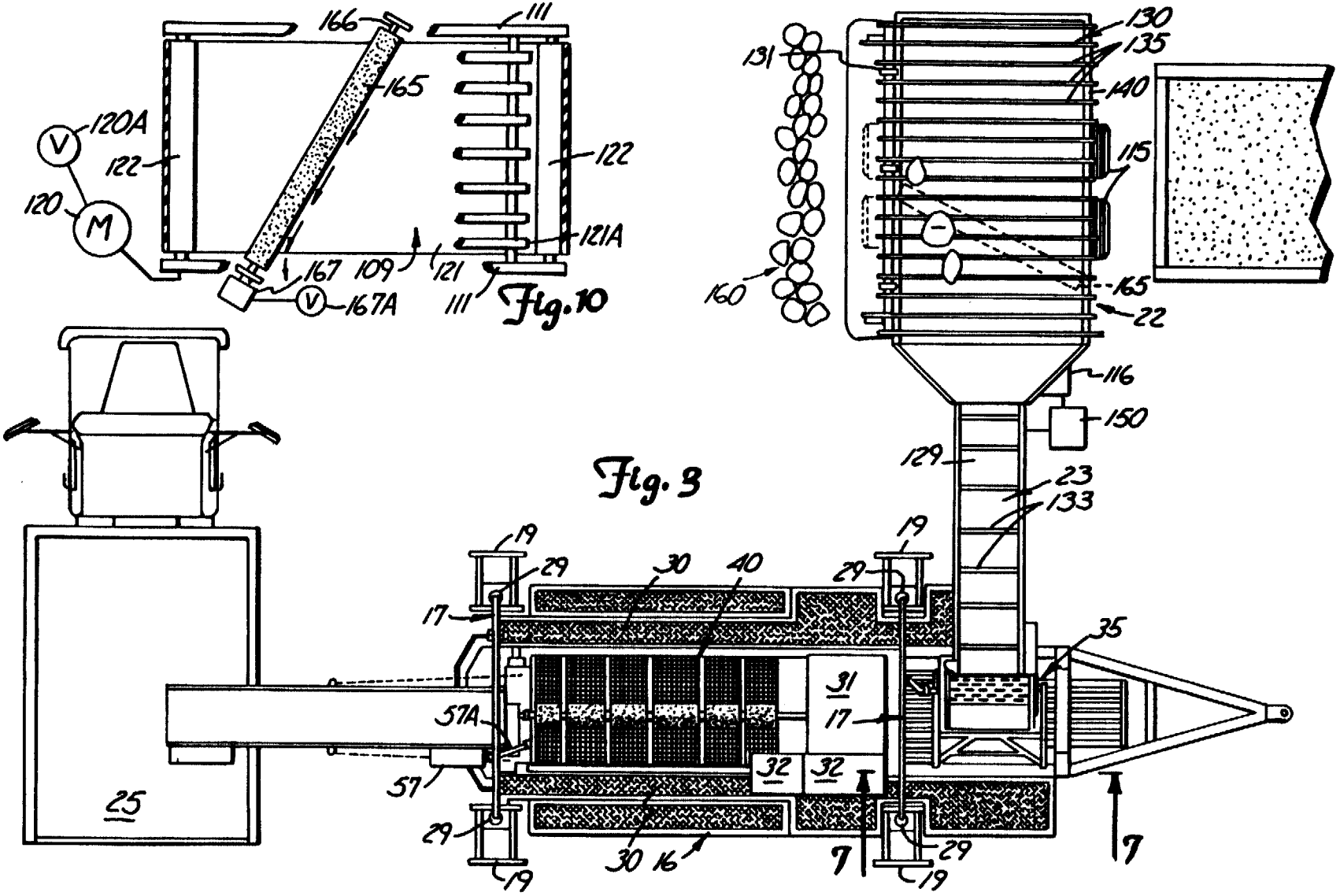
FIG. 3 is a top plan view of the typical arrangement of FIG. 1.
FIG. 10 is a part schematic to sectional view showing the interior of the conveyor belt forming the bottom of the holding bin shown in FIGS. 1 and 3.

A screening machine indicated generally at 15 includes a mobile frame screening machine 16 that contains the drum and other components for actually screening the dirt, and as shown it is supported on overhead frames 17 which are supported on suitable feet 19. The overhead frames have hoists or winches 20 to raise the machine upwardly and support it at a desired raised position above the ground sufficient to provide for clearance of conveyors and the like. The hoists can be conventional chain hoists or powered hoists used conventionally.

A holding bin 22 is provided at the input end of the machine for permitting material to be dumped from a loader, and stored and fed smoothly to the screening machine. The holding bin 22 is a separate trailer assembly, having a conveyor bottom and an upwardly inclined output conveyor 23 that will receive material from the bottom conveyor of the holding bin and deposit material to be screened into a pulverizer assembly 35, or directly onto another conveyor belt that will convey material to the screening drum.

A truck 25 can be placed at the output end of the screening machine 15 to receive material from the output conveyor 26 of the screening machine. The overhead frames 17 each have upright posts 18 at opposite ends of a cross member 18A. The cross members 18A are supported by the posts 18. The hoists or winches 20 are mounted onto the cross members 18A, and have chains or the like that will attach to the screening machine frame 16 for lifting and lowering the screening machine 15.

As shown, the screening frame 16 has fore and aft extending frame members 28 on opposite sides thereof, which carry suitable sleeves 29 that are slidably mounted on the posts 18,18 so that the screening machine 15 is guided upwardly as the hoists 20 are operated.

The screening machine frame 16 is of substantially the same design as that shown in prior U.S. Pat. No. 4,167,975, and thus the frame is shown only schematically. It does include longitudinal frame member 28A parallel to the member 28 and as many cross members as needed for support. The mounting of the screening drum is substantially the same in general as that shown in prior U.S. Pat. No. 4,167,975. The present device uses vibrating support rollers for the drum. As shown in FIG. 3, the longitudinal frame members 28 and also using inner longitudinal frame members 28A support walkways 30 on opposite sides of the machine 15 so that an operator can walk along the screening machine during operation. A gasoline engine 31 is mounted on the forward end of the frame and is used as a power source.

The engine 31 can drive through suitable gear boxes 32, to drive the various components. Mechanical drives such as universal joint shafts, belts or chains may be used, and the drives are shown only schematically in that they can be any desired form. Remote hydraulic motors operated by valves and powered from a hydraulic pump, in turn powered by engine 31, may be used as well.

The input of the screening plant is through the dirt pulverizer or shredder 35 (see FIGS. 7, 8 and 9), and will be more fully explained. Dirt and other material from the pulverizer drops through a grate member 36 comprising a pivoting grizzly bar assembly, onto an upwardly inclined conveyor 37, which in turn has its rear end positioned to deposit material into the interior of the screening drum 40.

Figures 4, 5:
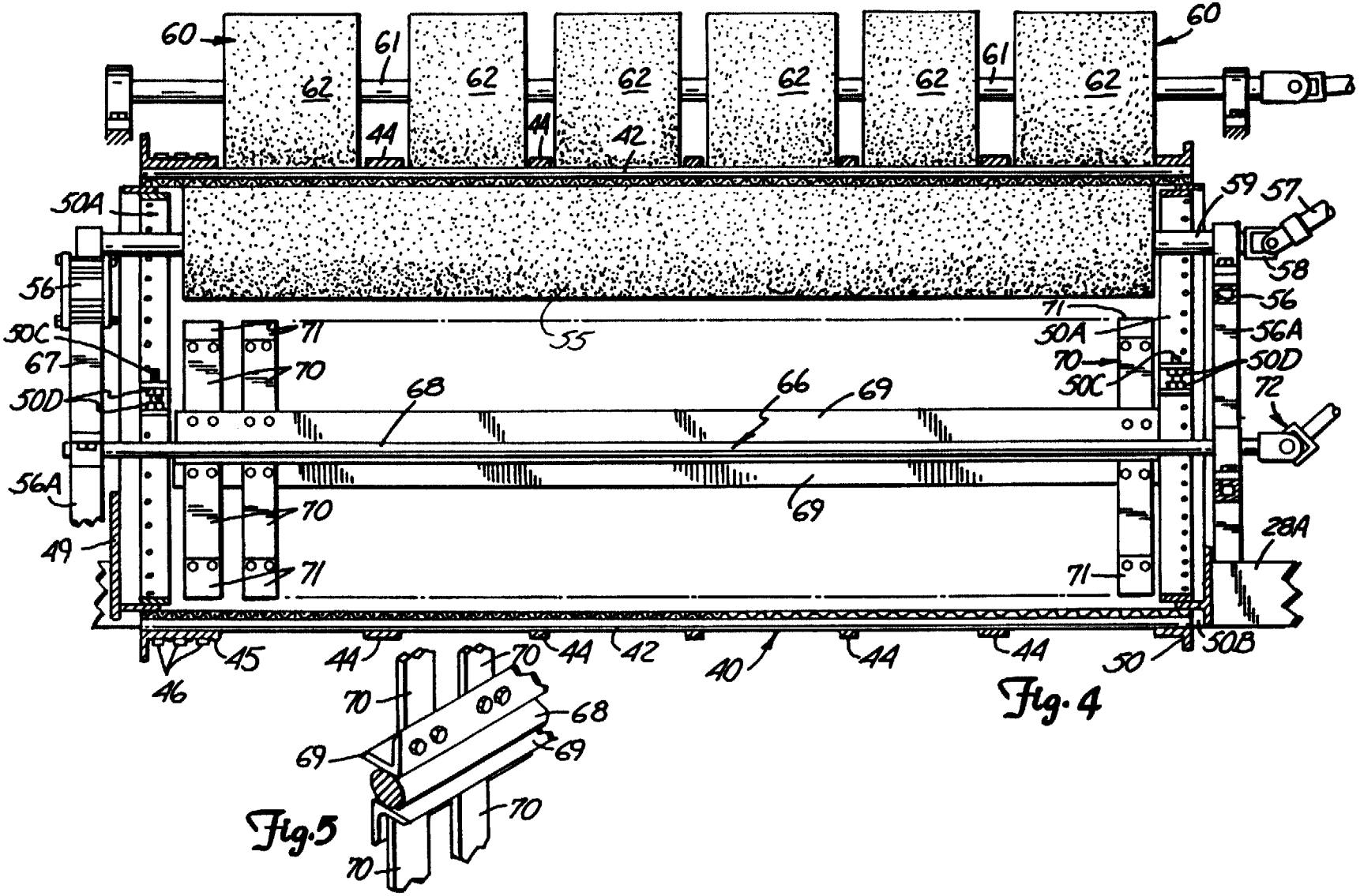
FIG. 4 is a vertical sectional view of the screening drum shown in FIG. 2.
FIG. 5 is a fragmentary perspective view of a beater bar used in the screening drum.

The screening drum 40 as shown in FIGS. 2 and 4, is a screening drum member having a plurality of longitudinally extending frame members or stringers, indicated at 42, with a screen or mesh material 43 on the interior of the drum frame. A plurality of annular frame support bands 44 are used for welding the longitudinally extending members together. At the input end of the drum 40 there is a flanged track 45 that is used for mounting a plurality of drive belts 46 that are driven from a pulley 47 as shown in FIG. 2. The pulley in turn is driven from the main engine 31 through a suitable shaft 48, or if desired, a hydraulic motor can be used. The belts 46 extend around the drum and rotate it about its central axis when powered. The drum itself is supported independently, and as can be seen, there is a second flanged track 50 at the rear portion of the drum. Support rollers 51,51 shown schematically in FIG. 2 are rotatably mounted on the frame 16 and are positioned to support the screening drum through annular bands 44. The rollers 51 are mounted on side frame member 28A in suitable bearings.

The screening drum rotates relative to front and rear frame plates and a rotating seal is desired at both the front and rear of the screening drum. The seal is mounted on the interior of the drum and extends out slightly to engage a frame member. Schematically as shown in FIGS. 4 and 7, a frame plate 49 is positioned adjacent the respective end of the screening drum to form a desired enclosure.

The seal is made of an initially flap strap of steel 50A and having a band of belting or other tough, flexible seal material fixed thereto. This assembly of the steel band and flexible strap are formed into a hoop and placed into the screening drum at each end. The ends of the strap 50B are bent up to form lugs and a threaded adjustment stud 50C is inserted through the lugs. Suitable nuts 50D are mounted on the stud and are threaded outwardly to expand the hoop and tighten it against the interior of the screening drum. The hoop is expanded sufficiently to clamp it in place. This expanding force also helps to clamp the screen in place in the end bands 44 and 45.

The seal is capable of being changed easily by loosening nuts 50D and removing the steel band. The band can be made in one- two or more sections that encircle the interior of the drum for ease of assembly.

Figures 6, 7, 12:
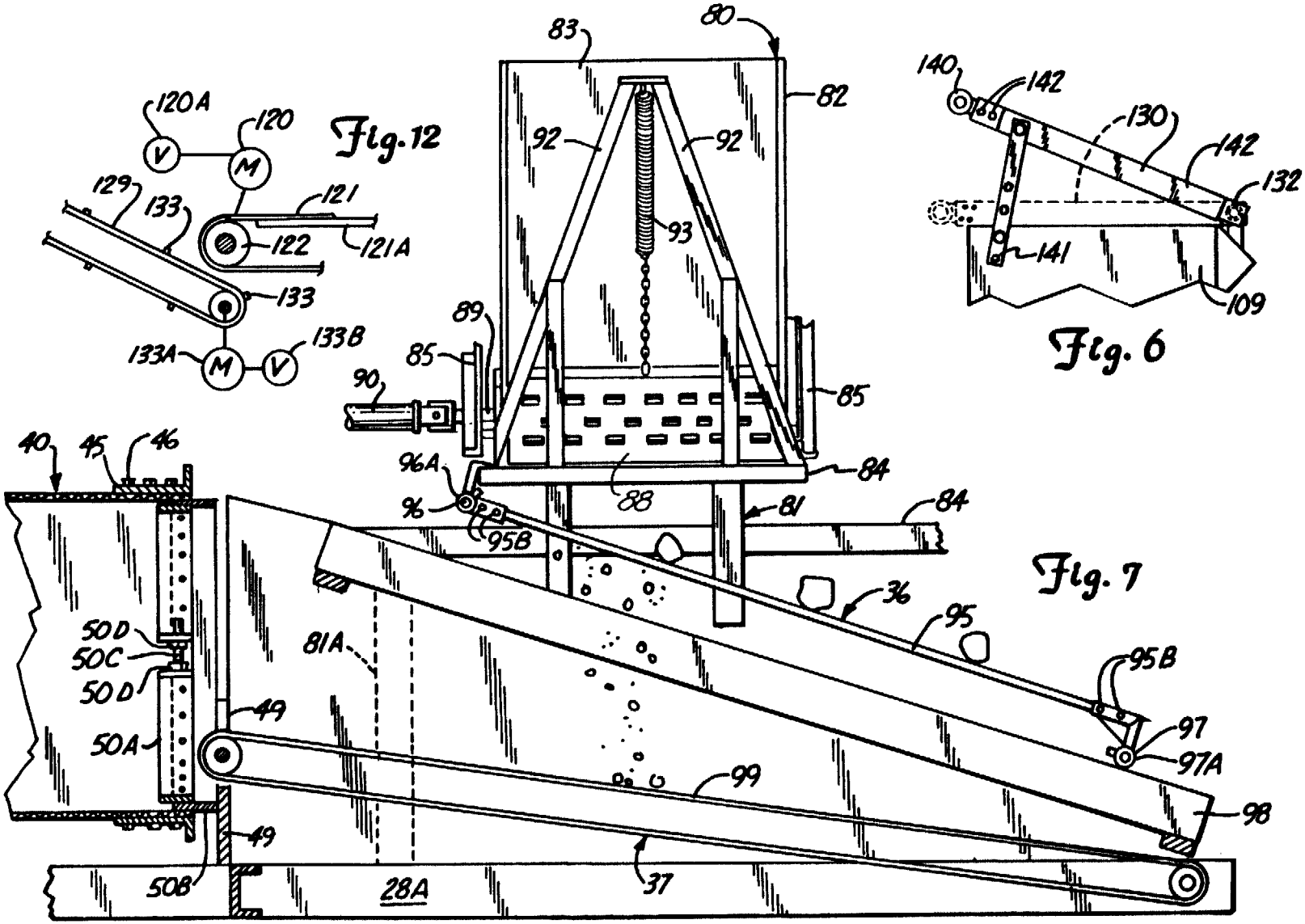
FIG. 6 is a part schematic sectional view of the upper portion of a holding bin and grizzly bar assembly showing an adjustment device therefore.
FIG. 7 is a fragmentary side sectional view of an input conveyor section and dirt pulverizer hopper taken on line 7—7 in FIG. 3.
FIG. 12 is a schematic side view showing the conveyor arrangement at the back of the holding bin of the present invention.

As can be seen in FIGS. 2 and 6, the support rollers 51 have axial extending, annularly spaced ribs 53 formed thereon on the outer surface at desired intervals, in order to provide for a vibrating or shaking action as the drum 40 is rotated through the drive belts 46. The drum 40 will rotate in direction as indicated by the arrow 54 in FIG. 2, and as it is rotated the ribs 53 on the support rollers 51 will vibrate and shake the drum 40 so that material, such as dirt being screened, will tend to fall through the screen openings onto a conveyor 52, which is standard and shown only schematically, and not merely clog the screen openings.

The drum 40 has an interior brush 55 having a shaft mounted in bearings attached to a suitable cross members 56 of the frame which in turn are supported on side uprights 56A. The uprights 56A are supported on frame member 28A. The cross members 56 are at the front and rear ends of the drum 40. The brush 55 is mounted in substantially the same manner as on the machine shown in U.S. Pat. No. 4,167,975.

The brush 55 has an axis parallel to the longitudinal axis of the drum 40 and is driven from the rear end of the drum 40. The drive is accomplished by providing a long drive shaft that extends rearwardly to a transfer case or gear case 57 (FIG. 3) mounted on the side of the rear conveying elevator 26. The transfer case 57 has output shafts that drive a power take-off shaft (a universal joint type shaft) 57A (FIGS. 3 and 4) that in turn connects through a universal joint 58 (FIG. 4) to the shaft 59 mounting the brush 55.

A second segmented brush indicated at 60 (FIGS. 2 and 4) is mounted for free wheeling rotation on the outside of the drum 40, and the bristle tips are substantially tangential to the drum 40. Brush 60 extends along an axis parallel to the axis of the screening drum and has a shaft 61 rotatably mounted in suitable bearings at its opposite ends which are supported from cross member 56 with uprights 56B. Brush segments 62 are positioned in between the support bands 44 for the screening drum. The brush 60 is free wheeling, as stated, and rotates in the direction shown by the arrows in FIG. 2. The brush 55 rotates under power in the direction as also indicated by the arrow. The second brush 60 is offset along the circumference of the peripheral wall of the screen drum 40 from the first brush 55.

Additionally, in order to break up dirt and material shown generally at 65 on the interior of the screening drum 40, a beater bar indicated at 66 is suitably mounted on supports 67 at opposite ends of the drum extending from the cross members 56. The beater bar comprises a rotating shaft 68 that has angle iron supports 69 attached thereto, which extend longitudinally along the drum 40, and each of the angle iron supports mounts a plurality of heavy belting flexible flaps 70, each of which extends about four inches along the axis. The flaps have hardened steel hammers or weights 71 attached to the outer ends of the flaps. The flaps are rotated at a speed to cause the flaps to extend radially out under centrifugal force from the angle irons 69 and are of sufficient length so the end hammers 71 engage and tend to break up dirt or other material in the screening drum. The beater flaps 70 are sized to move in a path adjacent to, but clear of the inside surface of the peripheral wall of the screening drum 40 and clear of the first brush 55. The beater bar 66 is rotated under power through a universal joint drive indicated at 72 in FIG. 4. The construction is shown in FIG. 5 as well. The shaft 68 with the angle iron supports 69 attached thereto can be seen in perspective. The flaps 70 and hammer 71 will rotate in the direction shown by the arrows 72A and the hammers 70 will mix into the dirt 65 and tend to break up clods and thus help to urge the dirt through the openings in the mesh or screen of the screening drum 40. The flaps 70 and steel hammers 71 break up the materials quickly and thoroughly with a minimum amount of wear.

As can be seen in FIGS. 3, 7, 8 and 9, the dirt pulverizer or shredder assembly 35 includes a hopper indicated generally at 80 which is mounted onto frame members 81 and frame member 81A, which are supported from the main frame side member 28A of the screening machine. The dirt shredder hopper 80 comprises two hopper sections. The first hopper section is a stationary section indicated at 82 in FIGS. 8 and 9, held stationary relative to the frame, and the second hopper section is a movable section indicated at 83. The pulverizer frame 81 includes cross frame members 84 which are of sufficient size and strength to support the hopper section 83 in position through a pair of pivoted arms 85. The arms 85 are pivoted as at 86 on brackets fixed to one of the cross frame members 84. The stationary hopper section 82 has side plates that are spaced laterally apart and will receive material from the input conveyor 23 of the holding bin 22. The movable hopper section 83 also has sides that fit on the interior of the side plates of the stationary section 82. The arms 85 carry the hopper section 83 and also support a powered rotating drum 88. The drum 88 has a shaft 89 that is mounted in suitable bearings on the ends of the arms 85, and this shaft 89 is powered through a power take off shaft 90 that has universal joints at its ends and which is driven from the engine 31 in a suitable manner.

Figure 8:
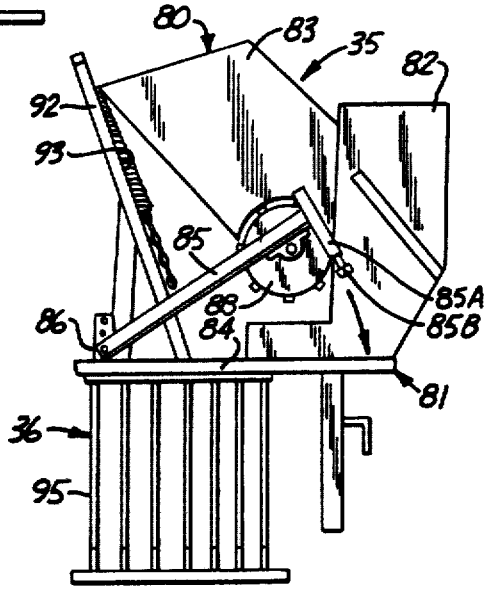
FIG. 8 is a front view of a dirt pulverizer shown in FIG. 7.

The arms 85 have stop members 85A at the ends thereof adjacent the roller or drum 88, and a stationary member 82, as shown in FIG. 8, has adjustable stop bolts 85B carried thereon. The stop bolts will engage the members 85A when the roller or drum 88 is adjacent the lower panel of the hopper 80 to maintain the desired clearance. This prevents the drum 88 from striking the bottom of the hopper when in use, but permits the drum 88 to move away from the hopper bottom to permit larger rocks to pass through without damaging the roller or hopper and drop onto a grizzly bar assembly below the hopper.

Figure 9:
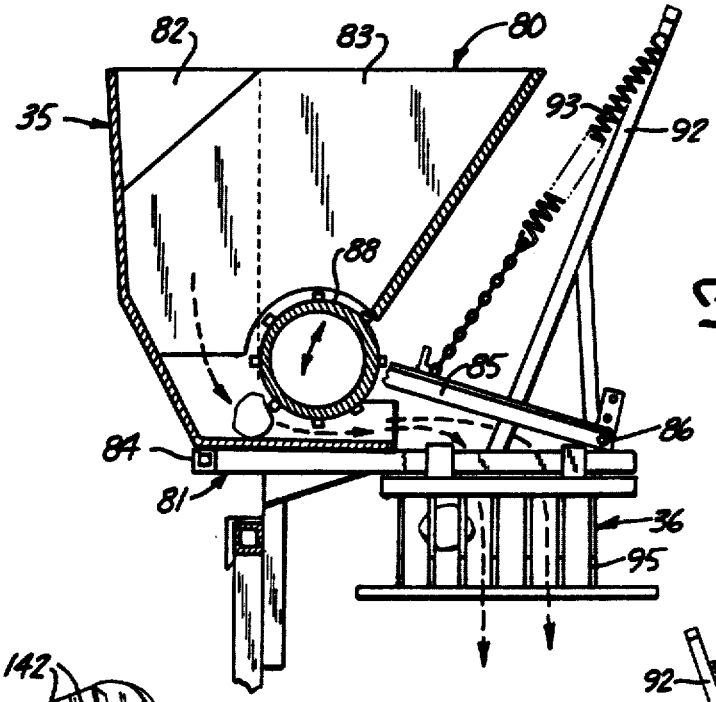
FIG. 9 is a vertical section view of the dirt pulverizer hopper of FIGS. 7 and 8.

As shown in the side view of FIGS. 7 and 9, a frame 92 is mounted onto the cross members 84, and carries a spring 93 that tends to exert a load tending to lift the arms 85 and the roller 88. The roller 88, as shown in FIG. 7 has a plurality of lugs on its outer surface at spaced intervals, and as the drum is rotated, it will tend to pulverize material and cause the material to drop down onto grizzly bars 95 that are supported on the rear one of the cross members 84 on a suitable pivot pipe 96 using adjustable hubs 96A that can be set screwed in place and selectively loosed to permit changing the spacings of the grizzly bars. The grizzly bars also are supported in a suitable manner onto a cross member shown at 97 on a frame 98 which is attached to the main frame above the conventional conveyor 99 for coveying material into the rotating drum 40. The cross member 97 also has hubs 97A that can be adjusted along the support 97 for changing the bar spacing. These grizzle bars 95 are made with a long section 95A that bolts to support sections on hubs 97A and 96A as shown at 95B so the long sections 95A can be replaced if they bend.

The conveyor 99 comprises a heavy duty belt that is powered in a suitable manner, such as that shown in the beach cleaning machine shown in U.S. Pat. No. 4,167,975. The frame 98 is supported on conveyor side plates which are also shown in U.S. Pat. No. 4,167,975. The conveyor 99 carries the prescreened materials that have been pulverized by drum 88 up into the screening drum 40. The grizzly bars 95 are spaced a desired distance apart so that large rocks will roll off the front of these bars onto the ground and be discarded. When the screeing machine is raised to its working position as shown in FIG. 1, a substantial pile of rocks and other debris can be collected before it is necessary to remove the pile of such rocks and debris.

The holding bin 22 has a conveyor belt bottom and an upwardly inclined discharge conveyor 23. The conveyor belts in the holding bin can be run independently of the other components of the screening machine, so that the conveyor 23 as well as the bottom conveyor belt of the holding bin 22 can be operated as desired to convey material toward the screening plant.

As shown, the holding bin hopper 109 has a trailer frame 110, and spaced side walls 111,111 of heavy duty reinforced construction. The conveyor 23 is mounted in a suitable manner to the rear portions of the holding bin 22. The frame 110 has a tongue 113 extending forwardly, which is supported in a suitable manner with a jack or other support 114 when the holding bin 22 is in use. Wheels 115 are used for providing support for the frame so that the holding bin can be moved to different locations. A suitable separate engine 116 is mounted on the holding bin for providing power. As shown in FIGS. 1 and 10, schematically, the bottom of the bin comprises a conveyor belt 121 that is mounted on suitable rollers 122,122 at opposite ends of the holding bin. The rollers 122 are supported in a suitable manner to the lower edge portions of the side walls 111 of the holding hopper 109. The rollers 122 are powered from the engine 116 in a suitable manner, for example, by driving a hydraulic system so the conveyor can be run intermittently. For simplicity of showing a hydraulic motor 120 is illustrated for driving the conveyor belt 121. The upper length of the conveyor belt 121 will be supported on support slats 121A (or a plate) which are supported on the side walls 111 of the holding bin hopper, to hold the belt 121 in proper position when dirt is placed in the holding bin hopper 109. Conveyors with support plates or slats for the conveyor belt are well known. A very high molecular weight polyethylene sheet is placed under all conveyor belts to lessen friction and to reduce the amount of dirt build up under the belts.

The rear portions of conveyor belt 121 are positioned above the conveyor belt 129 of the conveyor 23, as shown in FIG. 12, so that material coming off the upper reach of the conveyor belt 121 will be deposited onto the upper length of belt 130, and then conveyed upwardly as shown to be dropped into the dirt shredder hopper 80. The conveyor belts in the holding bin hopper can have suitable lugs 133 thereon for insuring that the material will be moved positively up into the dirt shredder hopper 80.

The side walls 111 of the holding bin hopper 109 are reinforced, and a shield or deflector plate 126 is mounted onto the top edge of one of the side walls 111, and extends outwardly and at an angle downwardly from the upper edge. The shield plate 126 is reinforced with suitable braces 127.

Figure 11:
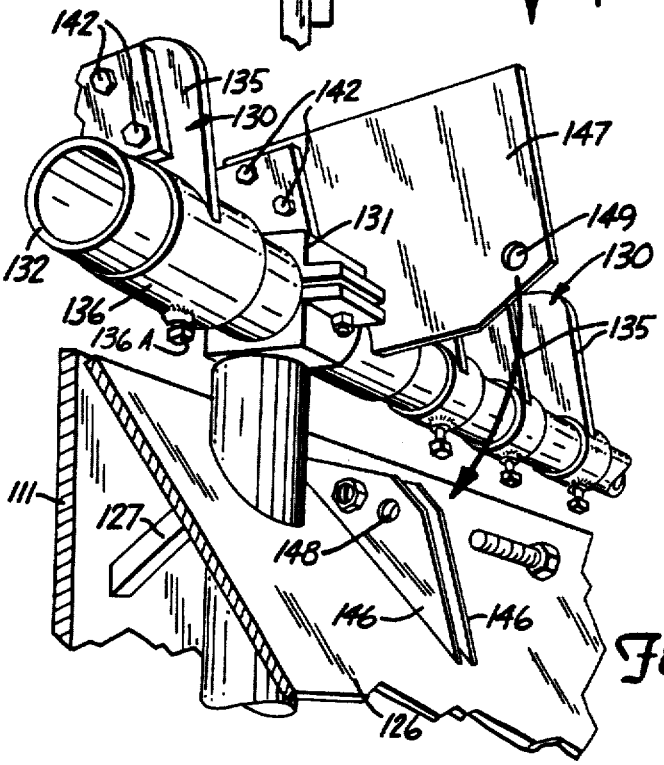
FIG. 11 is a perspective view of a support for the grizzly bars on the holding bin used with this invention.

This shield plate 126 prevents rocks in the material from falling down onto the wheels 115 of the holding bin, and also provides a slide for dumping the rocks that will collect on a grizzly bar or grate assembly indicated generally at 130 that is supported on this plate 126. As can be seen in FIG. 11, the plate 126 has supports thereon that mount hubs 131, in which a pipe 132 is rotatably mounted. The pipe 132 extends down along the edge of the side wall 111, and a plurality of elongated bars 135 are mounted with suitable adjustable hub members 136 (held with heavy clamp screws 136A) onto pipe 132. The hub members 136 may be loosened to change the spacing of the grizzly bars and the clamp screws 136A retightened.

The bars 135 are of sufficient length to span the width of the holding bin 22, and the ends of the bars opposite from the pipe 132 are fixed to and supported on a longitudinal pipe 140 (see FIG. 3) with hubs and set screws as well to permit adjustment. The pipe 140 is not attached to the holding bin wall. As shown, the bars 135 are spaced a desired width apart (for example nine inches) and can be changed easily. The grizzly bars will separate out large rocks indicated at 141 when bulk material is dumped into the holding bin. The larger rocks will stay in place when the bars 135 are horizontal or roll off if the assembly is inclined as shown in FIG. 6. The grizzly bar assembly 130 can be raised upwardly, for example with the bucket of a loader by lifting under the pipe 140 and tilting the grizzly bar assembly 130 upwardly. Safety chains are provided to prevent pivoting the grizzly bar assembly 130 too far, so it would go over center. Also, as shown in FIG. 6, the grizzly bars can be supported at a desired incline by supporting the assembly 130 on the end walls of the holding bin. Braces 141 are used between the assembly 130 and the side wall of the holding bin, as shown in FIG. 6. The angle of inclination is capable of being changed by bolting the braces 141 in selected positions to suit existing conditions. The grizzly bar assembly 130 thus can be inclined so rocks will roll off. Also, as shown in FIG. 6, the grizzly bars may be bolted to hubs at the ends with bolts 142 so the grizzly bar sections in the center can be removed for straightening as they bend.

The grizzly bar assembly 130 can be held or locked in a position with the grizzly bars raised, with the mechanism shown in FIG. 11. The plate 126 has at least two locations with spaced apart pairs of clips 146 thereon, and the pipe 132 has latch lugs 147 welded thereon which move to position between the two clips 146 forming a pair. As can be seen, the clips 146 have openings 148 which will align with openings 149 in the lugs 147, so that the grizzly bar assembly 130 can be pinned in an open position as shown in FIG. 11. The grizzly bars 135 are then out of the way when material that does not have rocks is being dumped into the holding bin. The grizzly bar assembly 130 also can have upright end plates at the front and rear ends to prevent material from falling off the assembly.

The holding bin bottom conveyor is run at selected speed so that the conveyor belt 121 will convey material to the upright conveyor 23. A variable speed valve 120A (FIG. 10) can be used for controlling the motor 120 to run at a very slow speed or a fast speed as desired. The upright conveyor 23 also can be powered from the engine 116, through a drive indicated schematically at 150 in FIG. 3 which has a clutch for stopping the device, or through a separate hydraulic motor shown schematically in FIG. 12 at 133A, and when it is run at a selected speed the conveyor 23 will be effective to regulate the amount of material being dumped into the dirt shredder hopper 80. The conveyor 23 also can be run at a desired speed by operating a valve 133B to control motor 133A.

The use of two grizzly bar assemblies permits graduated removal of rocks. In other words, the grizzly bar assembly 130 on the holding bin 22 takes out the very large rocks and when they are dumped they will be dumped into a pile shown at 160 in FIG. 3. The grizzly bars 95 receiving material from the pulverizing hopper 80 can be adjusted to remove smaller rocks. The size of classification of the rocks can be adjusted so that clods of dirt will still pass through. Of course, the pulverizing drum 88 will tend to break up dirt clods and pulverize and shred the dirt so that the screening job takes less time, and the screen itself has less of a tendency to plug up and less material has to go through the rotating screen or tumbler.

One of the problems with holding bins that transfer black dirt where conveyor belts are used is that the conveyor belt will tend to get dirt on the interior where it engages the driver rollers. In addition to use of a polyethylene layer, as shown in FIG. 10, an elongated brush indicated at 165 is positioned at an angle with respect to the longitudinal axis of the holding bin, as shown in dotted lines in FIG. 3, and brush 165 is mounted on a shaft 166 that is supported in suitable bearings at its opposite ends. The shaft 166 is driven from a hydraulic motor 167, in a suitable manner as shown schematically in FIG. 10. The angle of the brush axis insures that dirt, small rocks and other material will be brushed off and moved off the side of the conveyor belt 121 from the bottom of the holding bin hopper. The brush 165 has relatively stiff bristles and as shown is substantially the same size as the rollers 122 that mount the conveyor belt 121.

Additionally, interior belt scrapers are used on the upright conveyor belt 130, as well as the conveyor 26. The conveyor 26 at the output end of the machine is substantially the same as on that shown in the beach cleaning machine described in U.S. Pat. No. 4,167,975.

Suitable adjustments can be utilized for raising and lowering the conveyors and adjusting the angles thereof so that they will be above truck boxes, for example, the truck indicated at 25 in FIG. 1 and also in FIG. 3. The material that has been screened can be deposited directly in a truck and transported to its desired location.

Although the present invention has been described with reference to preferred embodiments, workers skilled in the art will recognize that changes may be made in form and detail without departing from the spirit and scope of the invention.

What is claimed is:

1. A screening machine for earth materials comprising:

a frame member;

a screening drum mounted on said frame member and rotatable about a longitudinal axis; said screening drum having a screen peripheral wall with openings therethrough to separate the materials being screened as to size;

means to support said drum for rotation about the longitudinal central axis with ends of the drum open to receive and discharge material to be screened;

a first rotary brush having an axis parallel to the longitudinal axis and mounted on the interior of the screening drum and having bristles engaging the screen peripheral wall;

a second rotary brush having an axis parallel to the longitudinal axis and mounted on the exterior of the screening drum and having bristles engaging said screen wall, the second brush being offset along the circumference of the screen peripheral wall from the first brush;

beater means mounted for rotation on a central shaft within said screening drum and having a plurality of spaced beater flaps thereon, each comprising a flexible material flap fixed to the shaft and hammer means fixed to outer ends of the flap to engage material being screened; and means for rotating said beater means independently of rotation of the drum at a speed to cause the beater flaps to extend radially under centrifugal force to break up clods of the earth material, and the beater flaps being of size and mounted to move in a path adjacent to but clear of said screen peripheral wall of the screening drum and clear of the first brush as the beater means is rotated.

2. The screening machine of claim 1 including dirt pulverizing roller means on an input end thereof, means to convey material from said dirt pulverizing roller means to the interior of said screening drum.

3. The screening machine of claim 2 wherein said dirt pulverizing roller means comprises a hopper for receiving material, said roller means being mounted to be rotatable about an axis and being located in the hopper, means to drive said roller means under power, and means to permit discharge of material that has been engaged by said roller means onto said means to convey.

4. The screening machine of claim 3 wherein the earth materials include rocks, and the screening machine further includes a grate assembly comprising a plurality of cross bars mounted to overlie the means to convey, said bars being spaced apart a desired distance to prevent the rocks from dropping onto the conveyor.

5. The screening machine of claim 4 including means for permitting adjustment of the spacing between said bars.

6. The screening machine of claim 1 used in combination with a holding bin for materials to be screened, said holding bin including, a conveyor bottom in the holding bin, means to power said conveyor bottom to move material in a first direction, and an elevating conveyor at an end of said holding bin to receive material from said bottom conveyor.

7. The screening machine of claim 6 including means to selectively run the bottom conveyor and the elevating conveyor.

8. The screening machine of claim 7 wherein said holding bin has a grizzly bar grate assembly at the upper surface thereof, through which material must pass to enter into the holding bin.

9. The screening machine of claim 8 wherein said grizzly bar assembly is pivotally mounted adjacent one side of said bin and is pivotally moveable from a position covering said holding bin to a raised position.

10. The screening machine of claim 9, and means to hold said grizzly bar assembly in an inclined position.

11. The apparatus as specified in claiim 1, wherein said flexible material flap comprises a length of heavy belting, and the hammer means comprise a hardened steel hammer attached to the outer end of said belting.

12. A screening machine according to claim 1, wherein the beater means comprises a shaft having a rotational axis that is offset from the longitudinal axis of said screening drum.

*13. A screening machine for earth materials comprising:*

*a frame member;*

*a screening drum mounted on said frame member and rotatable about a longitudinal axis; said screening drum having a screen peripheral wall with openings therethrough to separate the materials being screened as to size;*

*means to support said drum for rotation about the longitudinal axis with ends of the drum open to receive and discharge material to be screened;*

*beater means mounted for rotation on a central shaft within said screening drum and offset beneath said longitudinal axis of said screening drum toward said earth materials and having a plurality of spaced beater flaps thereon, each comprising a flexible elongated material flap fixed to the shaft at one end and hammer means fixed to outer ends of the flaps to engage material being screened; and*

*means for rotating said beater means independently of rotation of the screening drum at a speed to cause the beater flaps to extend radially under centrifugal force to break up clods of the earth material, and the beater flaps being of size and mounted to move in a path adjacent to but clear of the screen peripheral wall of the screening drum as the beater means is rotated.*

*14. A screening machine for earth materials comprising:*

*a frame member;*

*a screening drum mounted on said frame member and rotatable about a longitudinal axis; said screening drum having a screen peripheral wall with openings therethrough to separate the materials being screened as to size;*

*means to support said drum for rotation about the longitudinal axis with ends of the drum open to receive and discharge material to be screened;*

*a rotary brush having an axis parallel to the longitudinal axis of the drum and mounted to the frame and having bristles engaging the screen peripheral wall of the screening drum;*

*beater means mounted for rotation on a central shaft within said screening drum and offset beneath said longitudinal axis of said screening drum towards said earth materials and having a plurality of spaced beater flaps thereon, each comprising a flexible elongated member fixed to the shaft and hammer means fixed to outer ends of the elongated member to engage material being screened; and*

*means for rotating said beater means independently of rotation of the screening drum at a speed to cause the beater flaps to extend radially under centrifugal force to break up clods of the earth material, and the beater flaps being of size and mounted to move in a path adjacent to but clear of the screen peripheral wall of the screening drum as the beater means is rotated.*

*15. The screening machine of claim 14 and means for mounting the brush on the interior of the drum in a position spaced from the path of rotation of the beater means.*

* * * * *